(12) United States Patent
Hileman et al.

(10) Patent No.: US 6,788,846 B2
(45) Date of Patent: Sep. 7, 2004

(54) FIBER MANAGEMENT APPARATUS

(75) Inventors: Ronald Allan Hileman, East Freedom, PA (US); Eric James Hopkins, Newport, PA (US); Jeffrey Dean Shipe, Camp Hill, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 10/428,980

(22) Filed: May 1, 2003

(65) Prior Publication Data

US 2004/0028368 A1 Feb. 12, 2004

Related U.S. Application Data

(60) Provisional application No. 60/377,078, filed on May 1, 2002.

(51) Int. Cl.$^7$ ................................................. G02B 6/26
(52) U.S. Cl. .......................... 385/27; 385/134; 385/135
(58) Field of Search ........................ 385/27, 134, 135, 385/136, 137

(56) References Cited

U.S. PATENT DOCUMENTS

| | | | |
|---|---|---|---|
| 5,778,131 A | * | 7/1998 | Llewellyn et al. ........... 385/135 |
| 5,892,877 A | * | 4/1999 | Meyerhoefer ................ 385/136 |
| 6,249,634 B1 | * | 6/2001 | Tenney et al. ............... 385/135 |
| 6,289,160 B1 | * | 9/2001 | Daoud ......................... 385/135 |
| 6,311,007 B1 | * | 10/2001 | Daoud ......................... 385/135 |
| 6,360,050 B1 | * | 3/2002 | Moua et al. ................. 385/135 |
| 6,385,381 B1 | * | 5/2002 | Janus et al. ................. 385/135 |
| 6,445,865 B1 | * | 9/2002 | Janus et al. ................. 385/135 |
| 6,507,691 B1 | * | 1/2003 | Hunsinger et al. .......... 385/135 |
| 6,674,952 B2 | * | 1/2004 | Howell et al. ............... 385/135 |

* cited by examiner

*Primary Examiner*—AKM Enayet Ullah
*Assistant Examiner*—Jennifer Doan

(57) ABSTRACT

A modular fiber management system that comprises: (a) a tray defining a set of first ports, a set of second ports, and paths interconnecting at least a portion of the first and second ports, the paths being configured to limit the bend radius of one or more fibers contained therein to no less than the minimum bend radius of the fibers; (b) one or more first connectors and one or more second connectors, each first connector being disposed in a first port, and each second connector being disposed in a second port, each connector having an x, y and z orientation such that the z axis is along the optical axis of the connector; (c) a plurality of fibers interconnecting at least a portion of the first and second connectors and lying in the paths, each fiber having a certain amount of slack between the first connector and the second connector; and (d) wherein each connector is limited in movement along its x y and z axes relative to the tray, each connector being limited in movement along its x and y axes by the port in which it is contained, and each connector being limited in movement along its z axis by the amount of slack in the fiber terminated in the connector.

21 Claims, 3 Drawing Sheets

FIBER MANAGEMENT APPARATUS

RELATED APPLICATION

Priority is claimed to U.S. Provisional Patent Application No. 60/377,078 filed on May 1, 2002, which is hereby incorporated by reference.

FIELD OF THE INVENTION

The present invention relates generally to the management of optical fibers, and, more specifically, to an integrated routing tray for fiber management between connectors.

BACKGROUND OF THE INVENTION

Fiber optics have become increasing more popular in recent years. As the use of fiber optics has grown, a need for fiber management techniques has arisen. The management of optical fibers presents concerns than were not faced in conventional copper wire systems. For example, optical fibers require significantly greater care than do copper wires, as they cannot be bent sharply, crimped, or twisted. Thus, effective fiber management requires ensuring that the fibers are not subjected to bends greater than the minimum bend radius for the fibers (typically a 1" radius) while at the same time assuring that the fibers are routed to the desired locations. It is also important to make certain that the fibers contain enough slack in their path to allow for easy connection of the fiber optic connectors on each end. Since optical fibers and their assemblies tend to be expensive, effective fiber management is critical to ensure the optical fibers within a system are not damaged during system installation and maintenance.

Further complicating fiber management is the use of multi-fiber connectors such as the Lightray MPX connector, manufactured by Tyco Electronics (Harrisburg, Pa.). Multi-fiber connectors are used to join a plurality of connectors using a single ferrule. For example, one particular type of Lightray MPX connector joins eight optical fibers using a single ferrule. While these connectors provide an efficient means of connecting multiple fibers, they also increase dramatically the fiber density in an assembly. Consequently, in applications where several multi-fiber connectors are used, many individual fibers need to be managed.

What is desired is a method and apparatus to limit the potential for fiber damage during installation, operation, and maintenance of a fiber optic system. In particular, applicants have identified the need for a compact, preassembled modular system which limits the degrees of motion freedom available to the installer during assembly of the system to reduce the chance of mismatched fiber connections and excessive fiber bends, twists, or pulling.

SUMMARY OF THE INVENTION

In accordance with the present invention, a modular fiber management system is provided that allows for quick and simple connection of multiple fibers to a host system, while at the same time reducing the possibility of mismatched fibers and protecting the fibers from damage during the installation process. Specifically, the fiber management system of the present invention limits the movement of its connectors so that the reach of a particular connector is restricted to a certain space relative to the system. Since its reach is restricted, the connector can only mate with a connector of the host system which lies within the certain space. It cannot mate with host connectors which lie outside the certain space. Preferably, the certain space of one connector is exclusive of the certain spaces of other connectors. This way, no two connectors of the fiber management system can mate with the same connector of the host system. The fiber management system of the present invention also creates defined routing paths for multiple fibers that control the bend radii of each fiber and thus eliminate fiber failures caused by exceeding fiber bend tolerances.

In the preferred embodiment, the fiber management system is modular and comprises: (a) a tray defining a set of first ports, a set of second ports, and paths interconnecting at least a portion of the first and second ports, the paths being configured to limit the bend radius of one or more fibers contained therein to no less than the minimum bend radius of the fibers; (b) one or more first connectors and one or more second connectors, each first connector being disposed in a first port, and each second connector being disposed in a second port, each connector having an x, y and z orientation such that the z axis is along the optical axis of the connector; (c) a plurality of fibers interconnecting at least a portion of the first and second connectors and lying in the paths, each fiber having a certain amount of slack between the first connector and the second connector; and (d) wherein each connector is limited in movement along its x, y and z axes relative to the tray, each connector being limited in movement along its x and y axes by the port in which it is contained, and each connector being limited in movement along its z axis by the amount of slack in the fiber terminated in the connector.

DETAILED DESCRIPTION OF THE INVENTION

Figure 1:
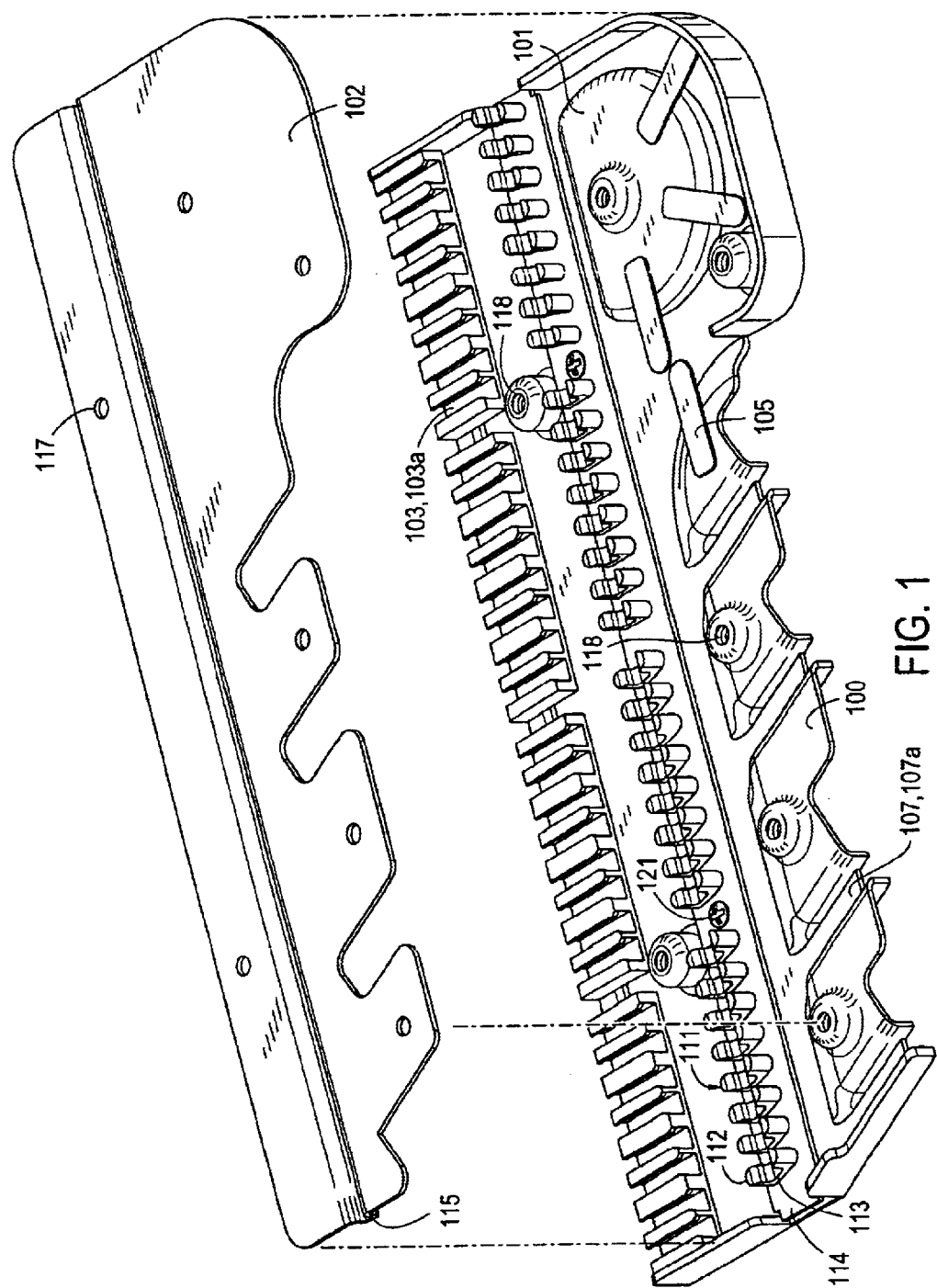
FIG. 1 is a perspective view of the fiber management apparatus in accordance with the present invention prior to the addition of the optical connectors and optical fibers.
Figure 2:
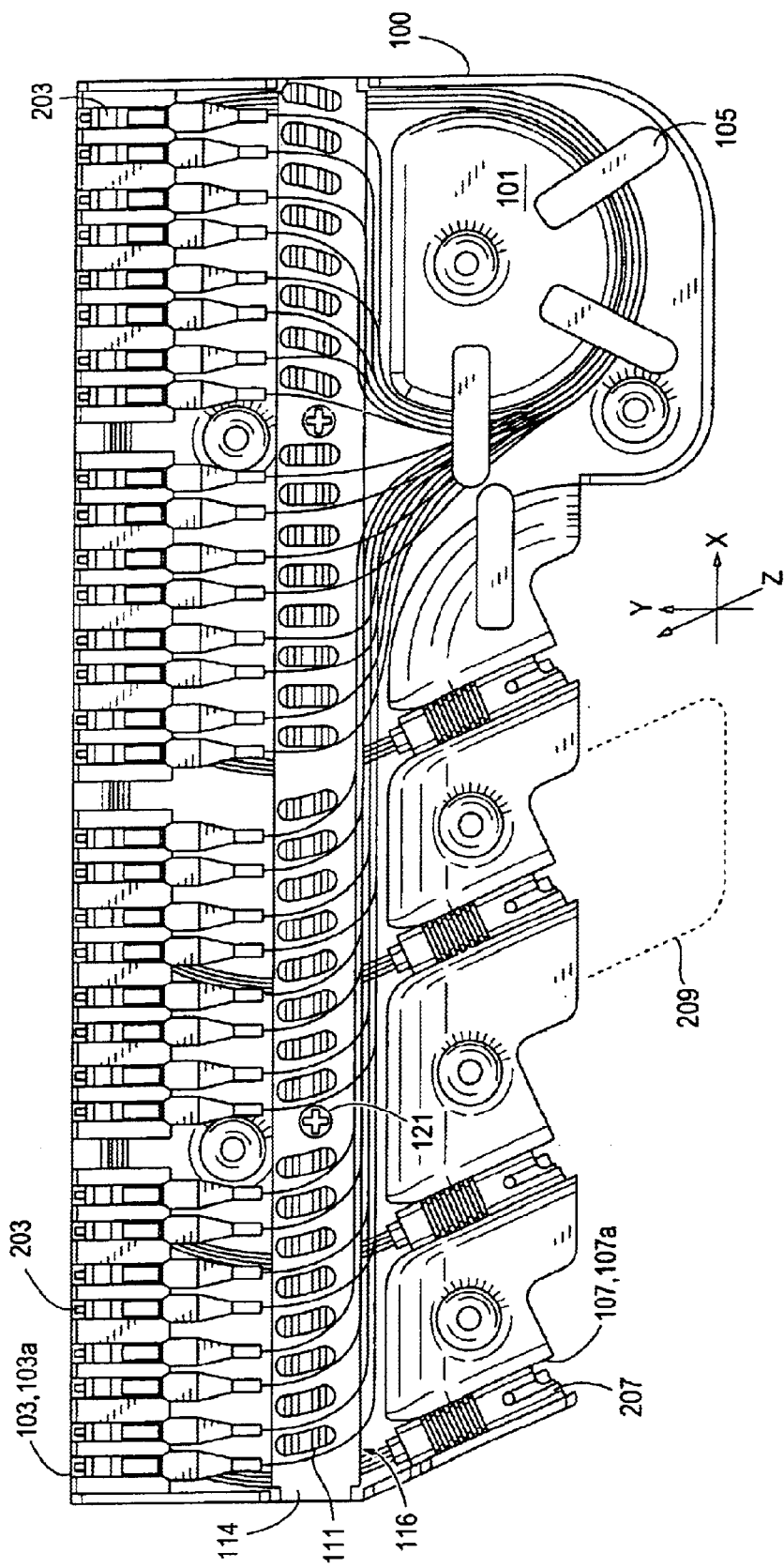
FIG. 2 is a top view (with the lid removed) of the fiber management apparatus in accordance with the present invention following the addition of the optical connectors and optical fibers.

Referring to FIG. 1, a preferred embodiment of a fiber management apparatus is shown. The apparatus is modular and comprises a tray 100 defining a set of first ports 107, a set of second ports 103, and paths interconnecting at least a portion of the first and second ports, the paths being configured to limit the bend radius of one or more fibers contained therein to no less than the minimum bend radius of the fibers. Referring to FIG. 2, the apparatus further comprises one or more first connectors 207 and one or more second connectors 203. Each first connector 203 is disposed in a first port 107, while each second connector is disposed in a second port 103. Each connector has an x, y and z orientation such that the z axis is along said optical axis of the connector. A plurality of fibers interconnects at least a portion of said first and second connectors and is disposed in the paths, each fiber having a certain amount of slack between the first connector 207 and the second connector 203. Each connector is limited in movement along its x, y and z axes relative to the tray 100. Specifically, each connector is limited in movement along its x and y axes by the port in which it is contained, and each connector being limited in movement along its z axis by the amount of slack in the fiber terminated in the connector.

In the illustrated embodiment, the apparatus is designed such that the first connectors 207 are multi-fiber connectors (such as the Lightray MPX) and the second connectors 203 are single fiber connectors (such as LC connectors). It is, however, understood that other connectors, both multi-fiber and single fiber, could also be used.

In a preferred embodiment, as illustrated in FIG. 1, the base of the apparatus comprises a tray 100. A plurality of recesses 107a are formed into the tray 100. The recesses form a set of first ports 107 in which a set of first connectors 207 resides. In addition, the tray contains a plurality of connector clips 103a along the opposite edge of the tray 100, as shown in FIGS. 1 and 2. The connector clips 103a provide a set of second ports 103 in which a set of second connectors 203 resides. Preferably, the tray 100, including the recesses 107a, is formed from a plastic substrate using an injection molded process; however, alternate embodiments include machining the elements from other materials such as aluminum. The rows of connector clips 103a can be formed on the tray using an injection molding process, although in the illustrated embodiment shown in FIG. 1 the connector clips are formed on a separate plastic bar mounted to the tray 100.

Paths are defined in the tray to direct a set of fibers from connectors residing in the first set of ports to connectors residing in the second set of ports. These paths comprise three segments: (1) a path from the set of first ports 107 to a slack absorbing spool 101; (2) a path around the slack absorbing spool 101, and (3) a path from the slack absorbing spool 101 to the set of second ports 103. Each entire path is configured to ensure that the fiber that travels along the path is not subjected to bending or twisting greater than its mechanical limitations, thus protecting the fiber from damage. In the preferred embodiment, the first segment of the path is formed during the vacuum process as cavities in the floor of the tray 100. Alternative embodiments include creating the first segment of the path by forming tabs on the tray, or allowing the fibers to reside on the surface of the tray confined only by the outer dimensions of the tray and the layer placed above the fibers.

The first segment of the fiber path directs the fiber to a slack absorbing spool 101. In the preferred embodiment, the spool 101 is formed directly onto the base of the router tray during the vacuum forming process. Alternative embodiments include mounting a machined spool or separately molded spool to the router tray.

The second segment of the fiber path directs the fiber around the spool 101. The slack absorbing spool 101 serves two main purposes. First, the spool acts to ensure that the fibers are not subject to excessive bending as they are routed between the first set of ports and the second set of ports. The spool 101 has a minimum radius equal to the minimum bend radius associated with optical fibers, typically 1 inch. By passing the fibers around the spool 101, a fiber path without any sharp bends is created. Secondly, the spool acts to absorb any slack in the fibers. By controlling how tight the fibers are wrapped around the spool 101, the amount of slack in each fiber on either end is controlled. The slack allowed in the fiber is used to control the amount of travel available to connectors residing in the first and second set of ports, as discussed in detail below.

A plurality of hold down fingers 105 are used to keep the optical fibers in place as they are routed around the spool 101. The fingers 105 are located at fixed intervals around the spool 101 and assure that the fibers remain wrapped around the spool and do not ride up out of the desired fiber path, where they could be subject to excessive bending or could become pinched when the fiber management tray lid 102 is installed.

The third segment of the fiber path directs the fibers from the slack absorbing spool to the second set of connectors. This portion of the fiber path is defined using a plurality of fiber directors 111. The fiber directors 111 are finger-like tabs that form individual paths for each fiber. In the preferred embodiment, the fiber directors 111 are formed on one or more plastic strips 114. The strips 114 containing the fiber directors 111 are formed from a plastic material using an injection molded process; however, alternate embodiments include machining the fiber directors from other materials such as aluminum. The strips 114 containing the fiber directors are mounted to the tray. In the preferred embodiment, this is accomplished using a series of hold-down screws or rivets 121, as shown on FIG. 1. After mounting, a vertical space 116 remains between the strips containing the fiber directors 111 and the base of the fiber management tray. This allows the optical fibers leaving the multi-fiber connectors to pass under the strips as they are directed to the slack absorbing spool 101. As each fiber exits the slack absorbing spool 101, it is directed to its respective single fiber connector by passing through its proper path created by the fiber directors 111.

Referring to FIG. 2, the fiber management tray in accordance with the present invention is illustrated after the connectors and associated fibers have been placed in the tray. Each recess 107a contains a multi-fiber connector. In the example shown in FIG. 2, Lightray MPX multi-fiber connectors 207 reside in the recesses 107a in the tray. The recesses 107a restrict connector movement with respect to the lengthwise direction of the apparatus and the height of the apparatus (the x direction and the y direction, respectively) while allowing limited movement in the axial direction with respect to the fibers (the z direction).

In the illustrated embodiment, each set of connector clips 103a contains a single fiber connector 203, such as an LC connector. The clips 103a perform the same function with respect to the single fiber connectors as the recesses 107a do with respect to the multi-fiber connectors. That is, namely, to limit the connector movement available. The clips 103a restrict the movement of the second connectors 203 with respect to the x direction and the y direction, while allowing limited movement in the z direction.

By limiting the amount of travel available to both the sets of first and second connectors, the possibility of mismatched connection is reduced or eliminated. The connectors are restricted in movement with respect to the tray 101 in both the x and y directions. Preferably, the amount of movement allowed in the x and y direction is no greater than twice the distance across the particular connector along its x and y axes, respectively. More preferably, the amount of movement allowed in the x and y direction is no greater than the distance across the particular connector along its x and y axes, respectively. Still more preferably, the amount of movement allowed in the x and y direction is no greater than one-half the distance across the particular connector along its x and y axes, respectively. Most preferred, the connectors are fixed with respect to the x and y axes.

A limited amount of travel is allowed along the z direction. This allows the installer to quickly and easily mate the connectors with corresponding mating connectors. This travel, however, is limited to avoid allowing the installer to mate the connector to an incorrect mating connector. In a preferred embodiment, the travel in the z-direction is limited to twice the length of the connector along the z-direction. More preferably, the travel in the z-direction is limited to the length of the connector along the z-direction. Still more preferably, the travel in the z-direction is limited to one-half the length of the connector along the z-direction. Using this more preferred embodiment, the connectors are prevented from extending forward far enough that they would no longer be controlled in the x and y direction by the ports in which they reside. Other embodiments allow the connector to move in the z-direction a great enough distance that the x and y directions are no longer controlled by the tray, but are still restricted by the fiber slack. Referring again to FIG. 2, a certain space 209 is created relative to the tray whereby a particular first connector can mate with a mating connector. Such a space 209 associated with a particular first connector is exclusive of the other certain spaces associated with other first connectors. Space 209 is illustrated with respect to one first connector, but it is understood that a corresponding space exists for each first connector. Additionally, similar spaces exist with respect to each second connector.

The connector movement in the z-direction is limited by controlling the slack in the fiber. The distance is limited by the amount of slack in the fiber between the ports in which a connector resides and the slack absorbing spool 101. The slack in the fiber between the ports in which a connector resides and the slack absorbing spool 101 will allow the connector be extended in the z-direction by the installer, but the slack absorbing spool 101 prevents the force on the fiber from pulling slack from beyond the spool. In this manner, the amount of travel in the z-direction can be closely controlled.

Figure 3:
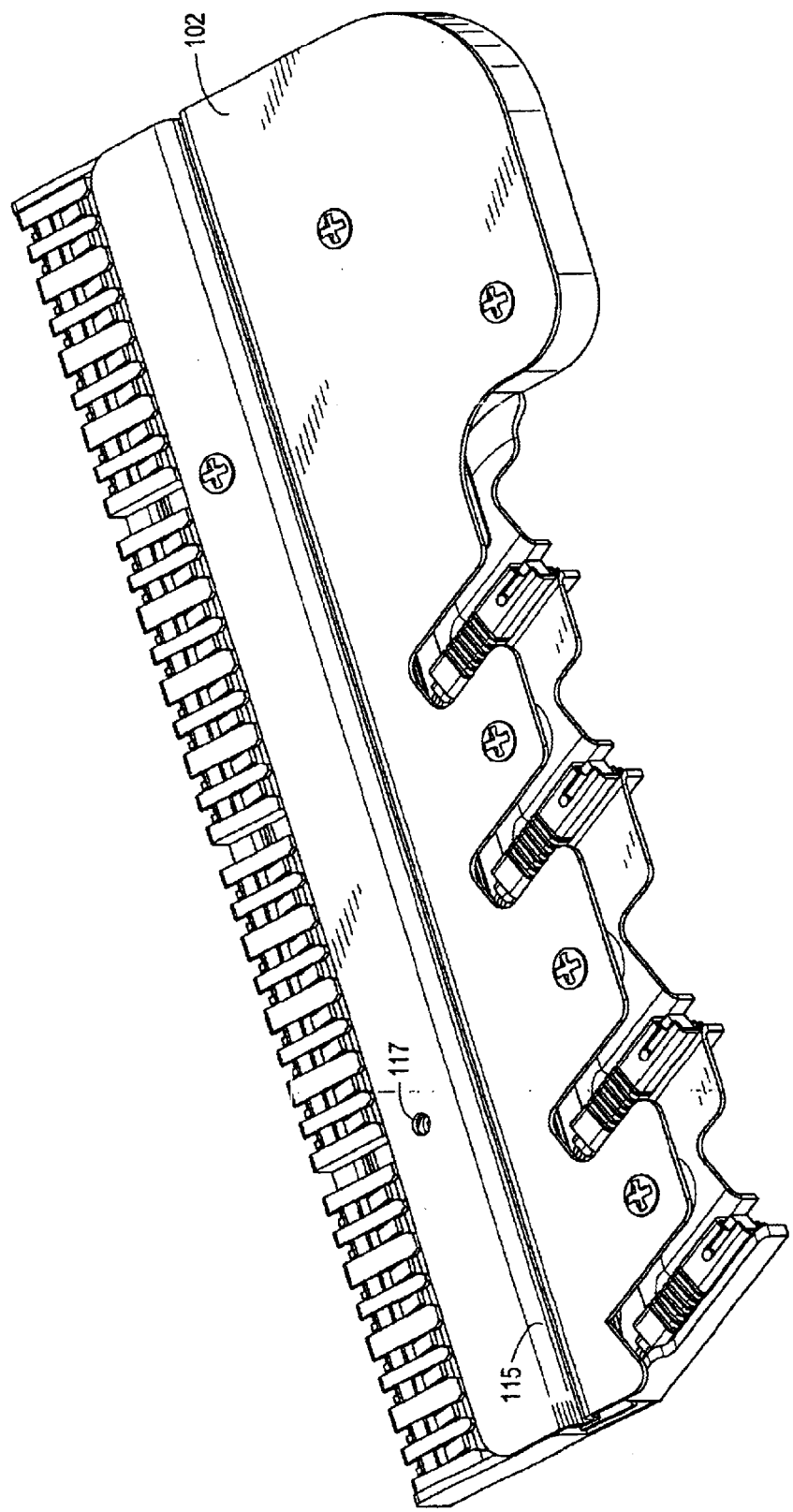
FIG. 3 is a perspective view (with the lid installed) of the fiber management apparatus in accordance with the present invention following the addition of the optical connectors and optical fibers.

Once the tray 100 is loaded with the optical connectors and the fibers have been placed in the fiber paths with the proper amount of slack present on each side of the slack absorbing spool 101, a lid 102 can be placed on the top of the tray 100 to enclose the components. Referring to FIG. 1, the lid 102 is shown before it is mounted to the module. FIG. 3 shows a closed tray ready to be mounted to the electronic equipment (e.g., a network router) which will be serviced by the optical fibers. In the preferred embodiment, the lid 102 is machine formed from aluminum; however, alternate embodiments include lids formed from molded or machined plastics, or from composite substrates. Located on the underside of the lid 102 is a rib 115 than fits into recessed portions 113 on the fiber directors 111. Referring again to FIG. 1, each fiber director 111 comprises two raised portions 112 and a recessed portion 113. The fiber directors 111 are formed in this configuration to allow for the rib 115 located on the underside of the lid 102 to fit into the recessed portion 113. This holds each fiber down into its respective fiber path, and avoids the potential for pinching of the fibers between the raised portions 112 and the lid 102. This rib also provides for an efficient means to align the lid with the fiber management tray. In the preferred embodiment, the lid is fastened to the tray using screws that extend through holes 117 in the lid to threaded inserts 118 in the tray.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

What is claimed is:

1. A module for managing fibers comprising:

a tray defining a set of first ports, a set of second ports, and paths interconnecting at least a portion of said first and second ports, said paths being configured to limit the bend radius of one or more fibers contained therein to no less than the minimum bend radius of the fibers;

one or more first connectors and one or more second connectors, each first connector being disposed in a first port, and each second connector being disposed in a second port, each connector having an x, y and z orientation such that the z axis is along said optical axis of the connector;

a plurality of fibers interconnecting at least a portion of said first and second connectors and lying in said paths, each fiber having a certain amount of slack between said first connector and said second connector;

wherein each connector is limited in movement along its x y and z axes relative to the tray, each connector being limited in movement along its x and y axes by the port in which it is contained, and each connector being limited in movement along its z axis by the amount of slack in the fiber terminated in the connector.

2. The module of claim 1, wherein the movement of a particular connector along its x and y axes is no greater than twice the distance across the particular connector along its x and y axes, respectively.

3. The module of claim 1, wherein the movement of a particular connector along its x and y axes is no greater than the distance across the particular connector along its x and y axes, respectively.

4. The module of claim 1, wherein the movement of a particular connector along its x and y axes is no greater than half the distance across the particular connector along its x and y axes, respectively.

5. The module of claim 1, wherein said connector's movement along the z axis is no greater than twice the length of the connector along its z axis.

6. The module of claim 1, wherein said connector's movement along the z axis is no greater than the length of the connector along its z axis.

7. The module of claim 1, wherein said connector's movement along the z axis is no greater than half the length of the connector along its z axis.

8. The module of claim 1, wherein said first connectors are multifiber connectors and said second connectors are single fiber connectors.

9. The module of claim 1, wherein fibers in a first connector are terminated in two or more second connectors.

10. The module of claim 1, wherein said tray comprises a series of recesses and a cover and wherein said first ports are defined at least in part by said recesses and said cover.

11. The module of claim 10, wherein said lid comprises a generally flat surface and a rib extending along the length of said lid.

12. The module of claim 10, wherein said base tray and said plurality of recesses in said base tray are formed using a vacuum forming process.

13. The module of claim 10, wherein said tray comprises a series of clips wherein said second ports are defined at least in part by said clips.

14. The module of claim 1, wherein said tray further comprises a slack absorbing spool mounted along one or more paths, said slack absorbing spool being adapted to spool a variable amount of fiber to control the amount of slack in the fiber.

15. The module of claim 14, wherein said slack absorbing spool is formed in said base tray using a vacuum forming process.

16. The module of claim 14, wherein said tray further comprises a plurality of fiber directors, wherein said fiber directors cause said fibers to follow a predetermined path from said slack absorbing spool to said second connector.

17. The module of claim 16, wherein each director of said plurality of fiber directors further comprise a first raised portion, a second raised portion, and a recessed portion, wherein said recessed portion is located between said first raised portion and said second raised portion.

18. The module of claim 17, wherein said tray comprises a lid having a generally flat surface and a rib extending along the length of said lid, rib residing in said recessed portion of said plurality of fiber directors upon installation of said lid on apparatus.

19. The module of claim 1, wherein said minimum bend radius is 1 in.

20. The module of claim 1, wherein each first connector is moveable relative to the tray such that it can be mated with a host connector disposed within a certain space relative to the tray and that the certain space associated with a particular first connector is exclusive of the other certain spaces associated with other first connectors.

21. The module of claim 20, wherein each second connector is moveable relative to the tray such that it can be mated with a host connector disposed within a certain space relative to the tray and that the certain space associated with a particular second connector is exclusive of the other certain spaces associated with other second connectors.

* * * * *